United States Patent
Hsieh

(10) Patent No.: US 10,715,596 B2
(45) Date of Patent: Jul. 14, 2020

(54) SERVER SYSTEM AND CONTROL METHOD FOR STORAGE UNIT

(71) Applicant: Wistron Corporation, New Taipei (TW)

(72) Inventor: Cheng-Kuang Hsieh, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 212 days.

(21) Appl. No.: 15/289,975

(22) Filed: Oct. 11, 2016

(65) Prior Publication Data

US 2018/0020052 A1    Jan. 18, 2018

(30) Foreign Application Priority Data

Jul. 12, 2016    (TW) .............................. 105121864 A

(51) Int. Cl.
*H04L 29/08*    (2006.01)
*G06F 3/06*    (2006.01)

(52) U.S. Cl.
CPC ........ *H04L 67/1097* (2013.01); *G06F 3/0607* (2013.01); *G06F 3/067* (2013.01); *G06F 3/0625* (2013.01); *G06F 3/0634* (2013.01); *G06F 3/0683* (2013.01); *H04L 29/08549* (2013.01); *H04L 67/125* (2013.01)

(58) Field of Classification Search
CPC ........... H04L 29/08549; H04L 67/1097; H04L 67/125; G06F 3/0634; G06F 3/0625; G06F 3/0607; G06F 3/0683; G06F 3/067
See application file for complete search history.

(56) References Cited

U.S. PATENT DOCUMENTS

| | | | | |
|---|---|---|---|---|
| 7,574,630 | B1 * | 8/2009 | Ranaweera | G06F 11/2092 714/43 |
| 9,626,326 | B2 * | 4/2017 | Chen | G06F 13/4068 |
| 2002/0069317 | A1 * | 6/2002 | Chow | G06F 3/067 711/104 |
| 2005/0086402 | A1 * | 4/2005 | Keng | G06F 3/0625 710/62 |
| 2006/0103966 | A1 * | 5/2006 | Georgis | G11B 15/6835 360/69 |

(Continued)

FOREIGN PATENT DOCUMENTS

TW    201610701    3/2016

*Primary Examiner* — Patrice L Winder
*Assistant Examiner* — Angela M Widhalm De Rodrig
(74) *Attorney, Agent, or Firm* — Winston Hsu

(57) ABSTRACT

A server system and a control method for a storage unit are provided. The server system includes multiple modular devices and a connection device. The storage unit in the modular devices includes a transmission interface expander. The transmission interface expander detects whether connects a former modular device, and sets the storage unit as a slave device of the former modular device when the transmission interface expander connects the former modular device. When the transmission interface expander does not connect the former modular device, the transmission interface expander is set as a storage node and communicates to the external server, and the latter storage unit connected behind the transmission interface expander becomes a slave device of the transmission interface expander.

9 Claims, 4 Drawing Sheets

(56) References Cited

U.S. PATENT DOCUMENTS

| | | | |
|---|---|---|---|
| 2011/0153798 A1* | 6/2011 | Groenendaal | H04L 63/20 |
| | | | 709/223 |
| 2014/0143447 A1* | 5/2014 | Wu | G06F 3/0685 |
| | | | 710/3 |
| 2014/0164845 A1* | 6/2014 | Wu | G06F 11/2221 |
| | | | 714/44 |
| 2015/0350322 A1* | 12/2015 | Akaike | G06F 3/0629 |
| | | | 707/827 |
| 2016/0072887 A1 | 3/2016 | Hsieh et al. | |
| 2016/0112516 A1* | 4/2016 | Liu | H04L 67/1097 |
| | | | 709/223 |
| 2016/0147478 A1* | 5/2016 | Katano | G06F 3/0635 |
| | | | 711/154 |
| 2016/0188515 A1* | 6/2016 | Lin | G06F 13/4022 |
| | | | 710/300 |
| 2017/0052919 A1* | 2/2017 | Purcell | G06F 13/4022 |

\* cited by examiner

SERVER SYSTEM AND CONTROL METHOD FOR STORAGE UNIT

CROSS-REFERENCE TO RELATED APPLICATION

This application claims the priority benefit of Taiwan application serial no. 105121864, filed on Jul. 12, 2016. The entirety of the above-mentioned patent application is hereby incorporated by reference herein and made a part of this specification.

BACKGROUND OF THE INVENTION

Field of the Invention

The invention relates to a serve control technique, and particularly relates to a server system and a control method for a storage unit.

Description of Related Art

Along with development of network technique, to provide services or exchange information through a network and cloud devices has been widely applied in various applications of information industry. The cloud devices used for providing the services are mainly divided into storage devices used for storing data and computing devices used for assisting logic computation, and a manufacturer generally purchase the storage devices and the computing devices respectively to construct an information room. Since the two types of devices respectively require functions of high availability (HA), redundancy, etc., each of the devices probably has two or more motherboards or management components for backup.

However, in recent years, many cluster systems and device application structures have been developed, for example, management software of Hadoop, etc., and related mechanisms the aforementioned high availability and data backup have been achieved by the management software, such that redundant management components used for implementing functions of the high availability and data backup in the storage device and the computing device become superfluous and unnecessary. The redundant management components increase purchase cost and power consumption of the cloud device, which is not in line with a current power saving trend. Moreover, a product design trend of a current data center is gradually replaced by a high density storage/computing server with a modular composite function. The storage/computing server with the modular composite function may change a function configuration thereof according to a requirement of the data center. Therefore, to research and develop a cloud device conformed with a current cluster system structure and meanwhile conformed with the power saving trend becomes an important target to be eagerly achieved by various manufacturers.

SUMMARY OF THE INVENTION

The invention is directed to a server system and a control method for a storage unit, where a serial attached SCSI (SAS) expander in the storage unit is adaptively switched as a slave device or a storage node, so as to effectively decrease cost and power consumption, and enhance user's flexibility in operation.

The invention provides a server system including a plurality of modular devices and a connection device. The modular devices consists of a plurality of storage units, a plurality of computing units or a combination thereof. The connection device connects a former modular device and a latter modular device in the modular devices. The storage unit in the modular devices includes a transmission interface expander. The transmission interface expander detects whether connects the former modular device, and sets the storage unit as a slave device of the former modular device when the transmission interface expander connects the former modular device. When the transmission interface expander does not connect the former modular device, the transmission interface expander is set as a storage node and communicates with an external server, and the storage unit connected behind the transmission interface expander becomes a slave device of the transmission interface expander.

The invention provides a control method of a storage unit, which is adapted to a server system including a plurality of modular devices. The storage unit is one of the modular devices, and a former modular device and a latter modular device in the modular devices are connected. The control method includes: detecting whether the former modular device is connected; setting the storage unit as a slave device of the former modular device when the former modular device is connected; setting the storage unit as a storage node to communicate with an external server when the former modular device is not connected; and managing other storage units connected behind the storage unit when the modular device connected behind the storage unit is other storage unit.

According to the above description, in the server system of the embodiment of the invention, the serial attached SCSI (SAS) expander automatically determines whether to serve as a slave device of the former modular device, or serve as a storage node. In this way, since the server system itself is unnecessary to configure additional management components to manage the modular devices in the server system, but SAS input/output controllers or the SAS expanders in the modular devices implement self management and communication with the external server. Therefore, the construction cost of the server system is saved, and power consumption is effectively decreased, and user's flexibility in operation is enhanced.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
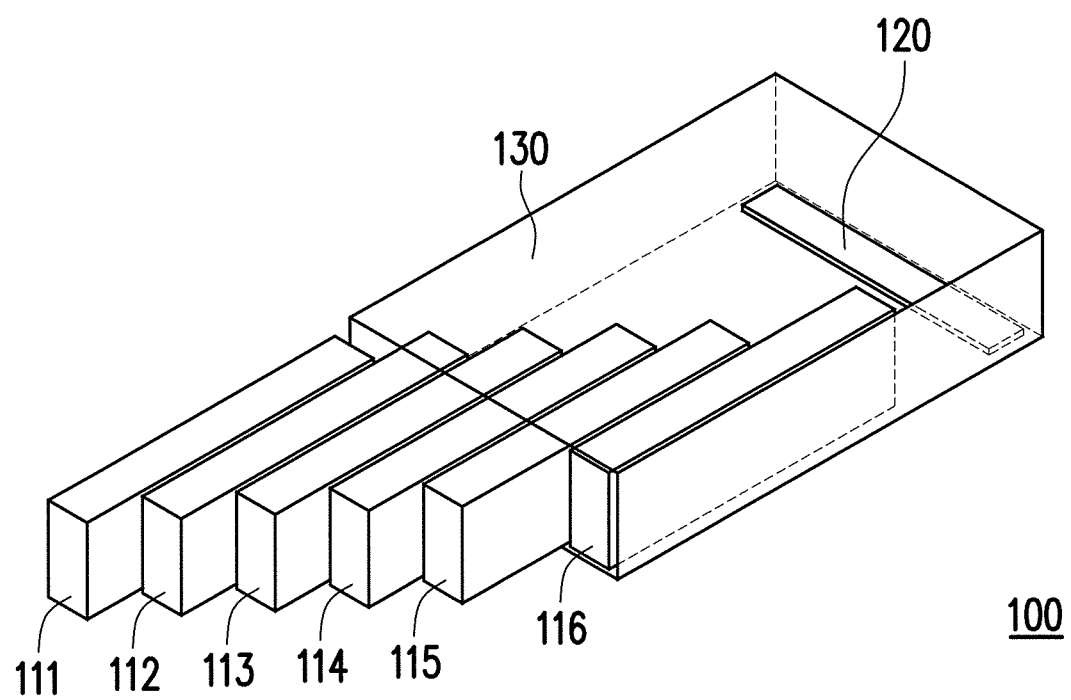
FIG. 1 is a schematic diagram of a server system according to an embodiment of the invention.

FIG. 1 is a schematic diagram of a server system 100 according to an embodiment of the invention. The server system 100 includes a plurality of modular devices 111-116, a connection device 120 and an external chassis 130. The modular devices 111-116 are designed to be electronic devices with a drawer-type module pattern, so as to facilitate the user drawing the same back for replacement and performing subsequent maintenance. The user may push the modular devices 111-116 into the chassis 130. The chassis 130 is used for containing the modular devices 111-1116 and the connection device 120. The connection device 120 provides electric energy to the modular devices 111-116 pushed to the bottom, and connects a former modular device with a latter modular device through a transmission interface (for example, a serial attached SCSI (SAS)). For example, the connection device 120 connects the modular device 111 with the modular device 112, and connects the modular device 112 with the modular device 113, and so on.

The server system 100 of the present embodiment has six modular devices 111-116. Those skilled in the art may adjust the number (for example, 4, 6, 8 and 10) of the modular devices according to an actual requirement. The modular devices 111-116 may consist of a plurality of storage units, a plurality of computing units or a combination thereof. In a corresponding embodiment of the invention, the server system 100 can be a pure storage server consisting of 6 storage units; a cold storage server having some computation function and consisting of one computing unit and 5 storage units; a haystack-type server application consisting of 2 computing units and 4 storage units, where each computing unit manages 2 storage units; a Hadoop-type server application consisting of 3 computing units and 3 corresponding storage units; a pure computing server consisting of 6 computing units. In this way, the server system 100 of the present embodiment may adaptively adjust a function thereof according to the type and the number of the modular devices.

Figure 2:
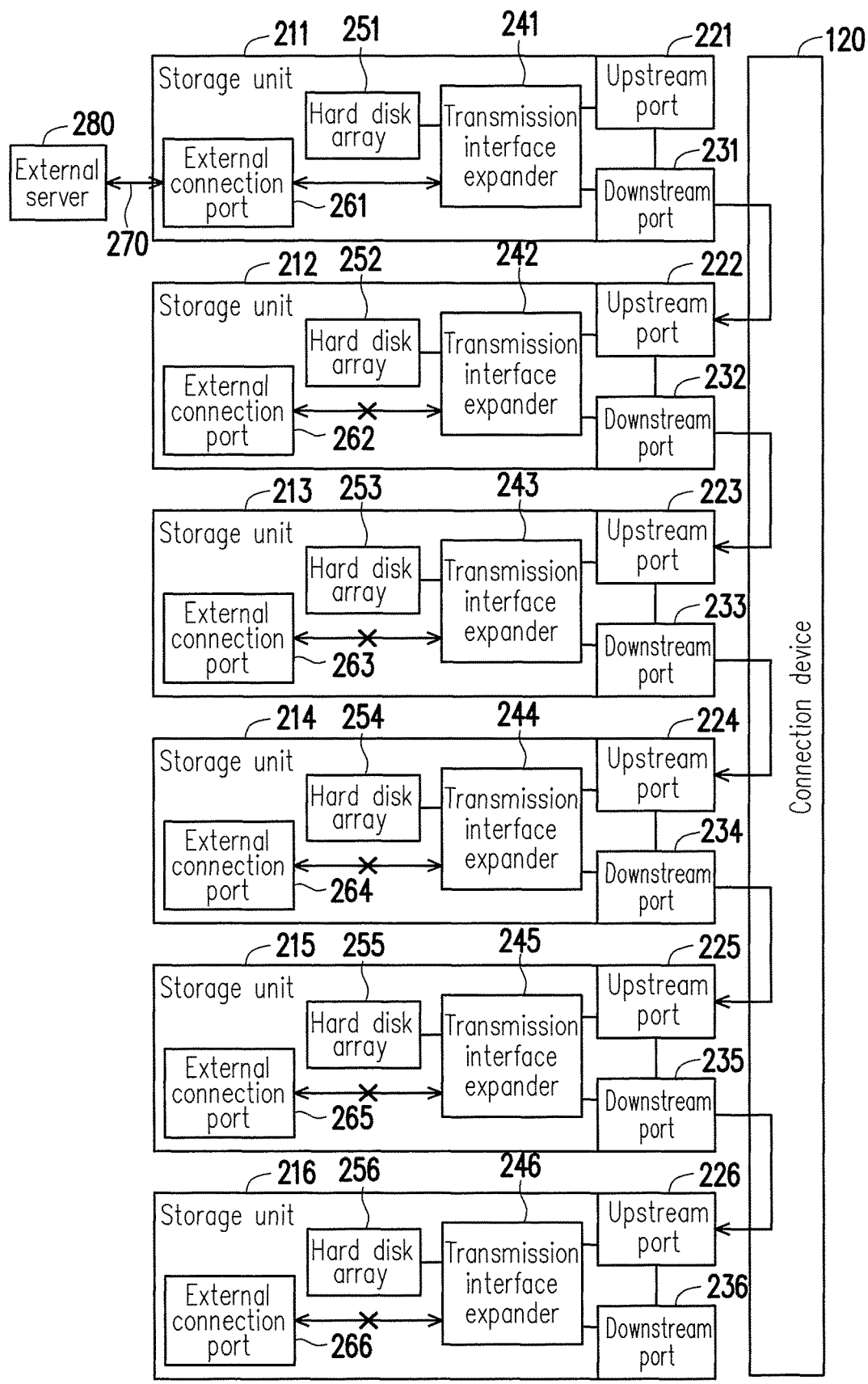
FIG. 2 is a block diagram of a server system according to a first embodiment of the invention.

In order to facilitate the description, in a following first embodiment of FIG. 2, a server system 200 having 6 storage units without the computing unit is taken as an example for description. FIG. 2 is a block diagram of a server system 200 according to the first embodiment of the invention. In other words, the modular devices 211-216 of the server system 200 are all storage units. Referring to FIG. 2, the modular devices 211-216 respectively have upstream ports 221-226 and downstream ports 231-236 complied with a transmission interface (for example, the serial attached SCSI (SAS)). The connection device 120 connects the downstream port of a former modular device with the upstream port of a latter modular device. For example, the connection device 120 connects the downstream port 232 of the modular device 212 with the upstream port 223 of the modular device 213; connects the downstream port 234 of the modular device 214 with the upstream port 225 of the modular device 215, and so on. It should be noted that the upstream port 221 of the first modular device 211 is not connected to other device, and the downstream port 236 of the last modular device 216 is not connected to other device.

The storage units (the modular devices 211-216) of the present embodiment respectively include transmission interface expanders 241-246. Since the modular devices 211-216 of FIG. 2 are all storage units, the modular devices 211-216 further respectively include hard disk arrays 251-256 and external transmission ports 261-266. Each of the hard disk arrays 251-256 of the present embodiment may include 18 hard disks.

Figure 3:
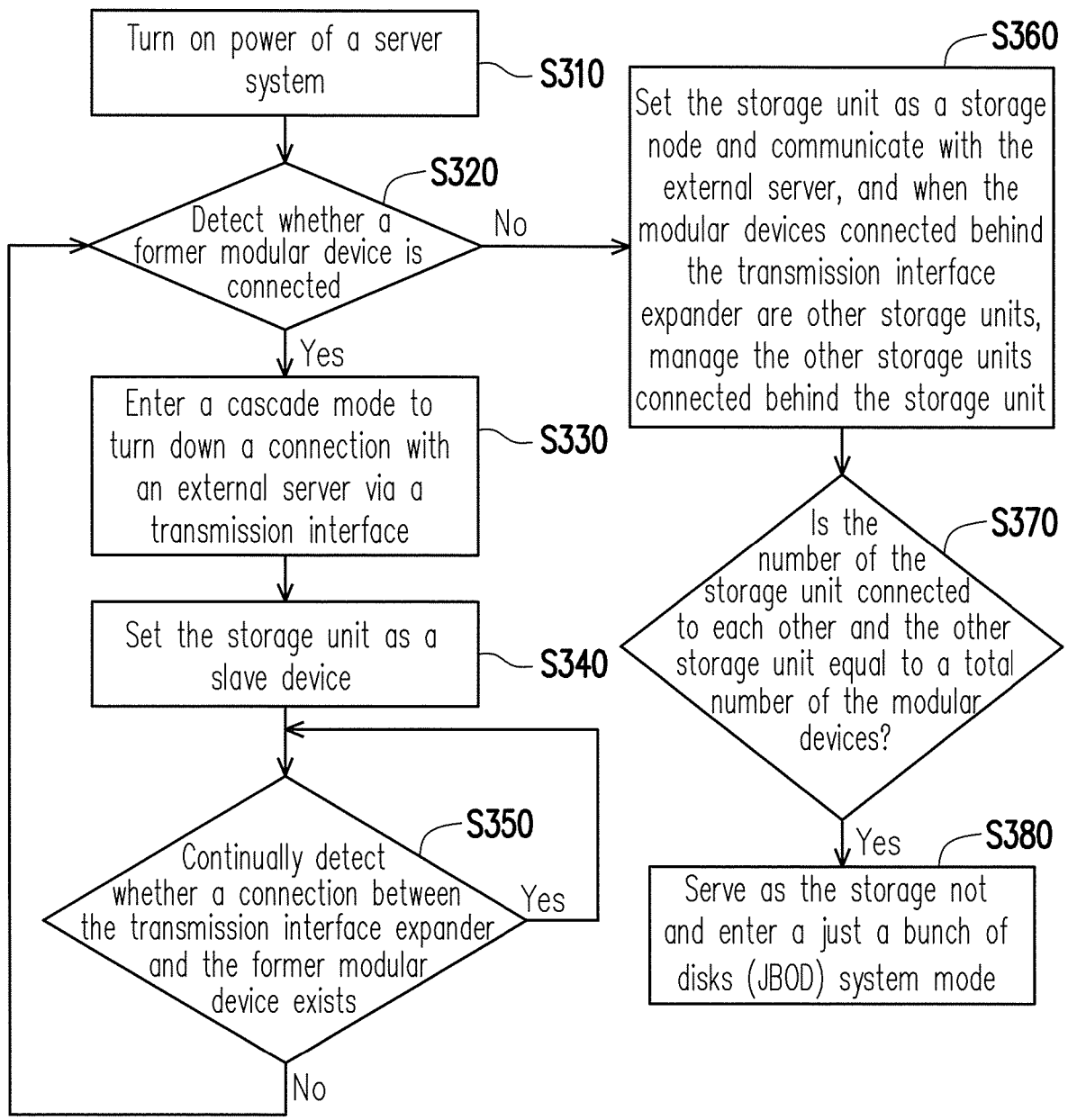
FIG. 3 is a flowchart illustrating a control method for storage unit according to an embodiment of the invention.

Operation steps of the transmission interface expanders 241-246 in the storage units are described below. FIG. 3 is a flowchart illustrating a control method for storage unit according to an embodiment of the invention. Referring to FIG. 2 and FIG. 3, in step S310, power of the server system 200 is turned on. In step S320, the transmission interface expanders 241-246 in each of the storage units detect whether connect a former modular device through the upstream ports 221-226 thereof. In the present embodiment, if the modular devices are storage units, the transmission interface expanders 241-246 in the storage units may connect the transmission interface expanders 242-246 in a next storage unit through the downstream ports 231-236.

An operation situation of each of the transmission interface expanders 242-246 connected to the former modular device is described below. When the transmission interface expanders (for example, the transmission interface expanders 242-246) are respectively connected to a former modular device, a step S330 is executed, where the transmission interface expanders 242-246 enter a cascade mode, and disable communication between the transmission interface expanders 242-246 and the external connection ports 262-266 to turn down the connection with an external server via the SAS transmission interface. The so-called "cascade mode" refers to that when the adjacent storage units are all slave devices, the storage units are connected in cascade with each other to form cascade type storage units. In step S340, the transmission interface expanders 242-246 set the storage units 212-216 as slave devices, such that the storage units 212-216 are controlled by the other modular devices connected to the upstream ports 221-226. In other words, the storage units 212-216 including the transmission interface expanders 242-246 are connected to each other in the cascade mode, and serve as the slave devices of the transmission interface expander 241 in the modular device 211.

In step S350, the transmission interface expanders 242-246 continually and respectively detect whether a connection with a former modular device exists. When one or a plurality of the storage units/the modular devices 211-216 is damaged or is unplugged by the user, the connection between each of the transmission interface expanders 242-246 and the former modular device probably does not exist. When the connection between each of the transmission interface expanders 242-246 and the former modular device continually exists, the transmission interface expanders 242-246 keeps monitoring in the step S350. On the other hand, when the connection between each of the transmission interface expanders 242-246 and the former modular device does not exist, the method flow is returned to the step S320.

An operation situation of the transmission interface expander 241 that is not connected to the former modular device is described below. When the transmission interface expander 241 determines that it is not connected to the former modular device in the step S320, a step S360 is executed, by which the transmission interface expander 241 enters a storage node mode to serve as a storage node, and communicates with the external server 280 through the external transmission port 261 (shown as an arrow 270), and the storage units connected behind the transmission interface expander 241 (for example, the storage units/the modular devices 212-216 connected in cascade in FIG. 2) become the slave devices of the transmission interface expander 241 and are managed by the same. In step S370, the front transmission interface expander 241 determines whether a total number of the mutually connected storage unit/the modular device 211 and the other storage units/the modular devices 212-216 is equal to a total number (for example, 6) of the modular devices in the server system 200. When the total number of the mutually connected storage units/the modular devices 212-216 is 6, besides that the transmission interface expander 241 serves as the storage node, it also enters a just a bunch of disks (JBOD) system mode, such that the external server 280 learns that the server system 200 only has a storage function and does not have a computing function.

In other words, since the server system 200 of FIG. 2 only has 6 storage units without the computing unit, the transmission interface expander 241 in the front storage unit/the modular device 211 manages/accesses the storage units/the modular devices 212-216 connected in cascade behind the transmission interface expander 241 through the inbuilt storage node mode and a corresponding function, and communicates with the external server 280 through the external transmission port 261, so as to achieve an effect of a storage server.

Figure 4:
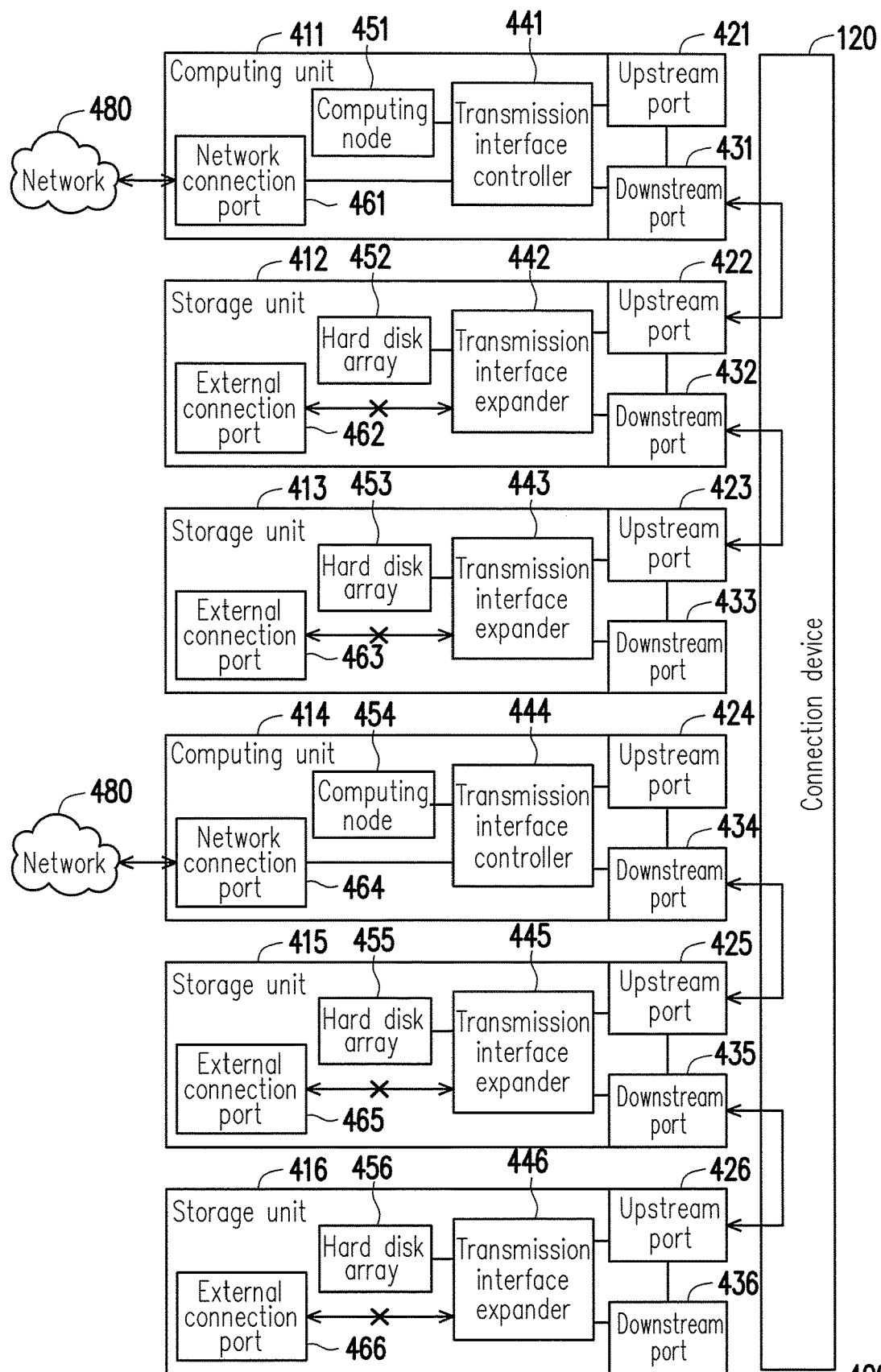
FIG. 4 is a block diagram of a server system according to a second embodiment of the invention.

FIG. 4 is a block diagram of a server system 400 according to a second embodiment of the invention. Modular devices 411 and 414 in the server system 400 are computing units, and modular devices 412-413, 415-416 are storage units. Since the modular devices 411 and 414 are the computing units, and the modular devices 411 and 414 do not have the hard disk arrays, but respectively include computing nodes 451 and 454 instead. The computing units 411 and 414 may communicate with an external server or external terminal of a network 480 through network connection ports 461 and 464.

The computing units/modular devices 411 and 414 respectively include upstream ports 421, 424, downstream ports 431, 434, transmission interface controllers 441, 444, the computing nodes 451, 454 and the network connection ports 461, 464. The transmission interface controllers 441, 444 can be SAS input/output controllers, and are used for managing and accessing the storage units connected behind the transmission interface controllers 441, 444 through the downstream ports 431, 434. The transmission interface controllers 441, 444 mainly take the computing nodes 451, 454 as functions thereof, and are connected to a switch or a router in the network 480 through the network connection ports 461, 464, so as to communicate with the external server to implement the computing function thereof. Moreover, the storage units 412, 413 connected behind the transmission interface controller 441 become the slave devices of the transmission interface controller 441, and the storage units 415, 416 connected behind the transmission interface controller 444 become the slave devices of the transmission interface controller 444.

Referring to FIG. 3 and FIG. 4, the transmission interface expanders 442, 443, 445 and 446 enter the step S330 from the step S320 to enter the cascade mode, and disable communication between the transmission interface expanders 442, 443, 445 and 446 and the external connection ports 462, 463, 465 and 466 to turn down the connection with the external server via the SAS transmission interface. In the step S340, the transmission interface expanders 442, 443, 445 and 446 respectively set the storage units/the modular devices 412-413, 415-416 as slave devices. In this way, the storage units/the modular devices 412-413 are controlled by the computing unit/the modular device 411 connected to the upstream ports 422, 423, and the storage units/the modular devices 415-416 are controlled by the computing unit/the modular device 414 connected to the upstream ports 425, 426.

It should be noted that the transmission interface controllers 441, 444 in the computing units do not detect a former modular device connected thereto through the upstream ports 421, 424, since the computing function of the computing units itself may allow the computing units to communicate with the external server. In other words, the transmission interface controllers 441, 444 may disable the upstream ports 421, 424 thereof. Therefore, the transmission interface controllers 441, 444 only require to determine whether the latter modular device is one or a plurality of storage units connected in cascade through the downstream ports 431, 434, and take theses storage units as the slave devices of the transmission interface controllers 441, 444.

In summary, in the server system of the embodiment of the invention, the serial attached SCSI (SAS) expander automatically determines whether to serve as a slave device of the former modular device, or serve as a storage node. In this way, since the server system itself is unnecessary to configure additional management components to manage the modular devices in the server system, but SAS input/output controllers or the SAS expanders in the modular devices implement self management and communication with the external server. Therefore, the construction cost of the server system is saved, and power consumption is effectively decreased, and user's flexibility in operation is enhanced.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A server system, comprising:
   a plurality of modular devices, consisting of a plurality of storage units, a plurality of computing units or a combination thereof; and
   a connection device, connecting the modular devices,
   wherein the modular devices are connected in a sequence by the connection device,
   a storage unit in the modular devices comprises a transmission interface expander,
   the transmission interface expander detects whether the storage unit connects a modular device prior to the storage unit in the sequence, and sets the storage unit as a slave device of the modular device prior to the storage unit in the sequence when the transmission interface expander connects the modular device prior to the storage unit in the sequence, and
   when the transmission interface expander does not connect any modular device prior to the storage unit in the sequence, the transmission interface expander is set as a storage node and communicates with an external server, and another storage unit connected behind the transmission interface expander in the sequence becomes a slave device of the transmission interface expander;
   wherein when the transmission interface expander connects the modular device prior to the storage unit in the sequence, the transmission interface expander enters a cascade mode to turn down a connection with the external server via the transmission interface, and sets the storage unit as the slave device such that the storage unit is controlled by the other modular device connected thereto, and continually detects whether a connection between the transmission interface expander and the modular device prior to the storage unit in the sequence exists,
   when the connection between the transmission interface expander and the modular device prior to the storage unit in the sequence does not exist, the transmission interface expander is set as the storage node and communicates with the external server.

2. The server system as claimed in claim 1, wherein each of the modular devices has a downstream port and an upstream port complied with a transmission interface, and the connection module connects the downstream port of a former modular device with the upstream port of a latter modular device in the sequence.

3. The server system as claimed in claim 1, wherein the computing unit comprises a transmission interface controller, the transmission interface controller serves as a computing node to communicate with the external server, and the storage unit connected behind the transmission interface controller becomes a slave device of the transmission interface controller.

4. The server system as claimed in claim 1, wherein when the transmission interface expander does not connect the modular device prior to the storage unit in the sequence, and the number of the storage units connected to each other is equal to a total number of the modular devices, the transmission interface expander of a first storage unit serves as the storage node and enters a just a bunch of disks (JBOD) system mode.

5. The server system as claimed in claim 1, wherein the transmission interface is a serial attached SCSI (SAS).

6. A control method of a storage unit, adapted to a server system comprising a plurality of modular devices with a transmission interface expander, wherein a storage unit is one of the modular devices, and the modular devices are connected in a sequence, the control method comprising:
    detecting whether the storage unit connects a modular device prior to the storage unit in the sequence;
    setting the storage unit as a slave device when the storage unit connects a modular device prior to the storage unit in the sequence such that the storage unit is controlled by the other modular device;
    setting the storage unit as a storage node to communicate with an external server when the storage unit does not connect any modular device prior to the storage unit in the sequence; and managing other storage units connected behind the storage unit in the sequence when a modular device connected behind the storage unit is other storage unit;

wherein in response to the transmission interface expander connecting the modular device prior to the storage unit in the sequence, the transmission interface expander enters a cascade mode to turn down a connection with the external server via the transmission interface, and sets the storage unit as the slave device such that the storage unit is controlled by the other modular device connected thereto, and continually detects whether a connection between the transmission interface expander and the modular device prior to the storage unit in the sequence exists, and wherein the transmission interface expander is set as the storage node and communicates with the external server in response to the transmission interface expander not connecting the modular device prior to the storage unit in the sequence.

7. The control method of the storage unit as claimed in claim 6, wherein each of the modular devices has a downstream port and an upstream port complied with a transmission interface, and the downstream port of a former modular device is connected with the upstream port of a latter modular device in the sequence.

8. The control method of the storage unit as claimed in claim 6, further comprising:
    entering a cascade mode to turn down a connection with the external server via the transmission interface when the modular device prior to the storage unit in the sequence is connected;
    setting the storage unit as the slave device of the modular device prior to the storage unit in the sequence; and
    continually detecting whether a connection between the transmission interface expander and the modular device prior to the storage unit in the sequence exists.

9. The control method of the storage unit as claimed in claim 6, further comprising:
    setting the storage unit as the storage node and entering a just a bunch of disks (JBOD) system mode when the storage unit does not connect the modular device prior to the storage unit in the sequence, and the number of the storage units connected to each other and the other storage units is equal to a total number of the modular devices.

* * * * *